US012756147B2

(12) United States Patent
Dar

(10) Patent No.: US 12,756,147 B2
(45) Date of Patent: Oct. 6, 2026

(54) QUICK DISCONNECT ELECTRIC VEHICLE CHARGING CABLE CONNECTOR

(71) Applicant: DG Matrix, Inc., Raleigh, NC (US)

(72) Inventor: Ahsan Dar, Lahore (PK)

(73) Assignee: DG Matrix, Inc., Raleigh, NC (US)

( * ) Notice: Subject to any disclaimer, the term of this patent is extended or adjusted under 35 U.S.C. 154(b) by 350 days.

(21) Appl. No.: 18/627,579

(22) Filed: Apr. 5, 2024

(65) Prior Publication Data

US 2024/0347990 A1 Oct. 17, 2024

Related U.S. Application Data

(63) Continuation of application No. PCT/US2023/029981, filed on Aug. 10, 2023.

(60) Provisional application No. 63/471,111, filed on Jun. 5, 2023.

(51) Int. Cl.

| | |
|---|---|
| ***H01R 27/00*** | (2006.01) |
| ***B60L 53/18*** | (2019.01) |
| ***H01R 13/05*** | (2006.01) |

(52) U.S. Cl.

CPC .............. *H01R 27/00* (2013.01); *B60L 53/18* (2019.02); *H01R 13/05* (2013.01); *H01R 2201/26* (2013.01)

(58) Field of Classification Search

CPC .... H01R 27/00; H01R 13/05; H01R 2201/26; H01R 13/71; B60L 53/18; B60L 53/16; F16D 1/112

See application file for complete search history.

(56) References Cited

U.S. PATENT DOCUMENTS

| | | | | |
|---|---|---|---|---|
| 3,727,172 | A * | 4/1973 | Clark | H01R 13/625 439/595 |
| 4,520,243 | A * | 5/1985 | McIntyre | H01R 13/71 200/51.09 |
| 4,645,286 | A | 2/1987 | Isban et al. | |
| 8,025,528 | B2 | 9/2011 | Smith | |
| 10,718,383 | B2 * | 7/2020 | Spector | F16D 1/112 |
| 2021/0376521 | A1 * | 12/2021 | Tie | H01R 13/6315 |

OTHER PUBLICATIONS

International Search Report and Written Opinion dated Jan. 9, 2024 issued by the International Application Division, Korean Intellectual Property Office as International Searching Authority in connection with International Application No. PCT/US2023/029981 (7 pages).

* cited by examiner

*Primary Examiner* — Edwin A. Leon

(74) *Attorney, Agent, or Firm* — Neo IP

(57) ABSTRACT

A charge cable connection system includes male and female connectors. The male connector includes a plurality of spring-loaded pins including a central pin connected to an earth wire. The female connector includes a plurality of insertion points able to receive the pins of the male connector and rotate through radial slots until the insertion points align with openings such that the pins are able to be pushed forward by respective springs until they tightly connect corresponding pins of the female connector.

20 Claims, 6 Drawing Sheets

QUICK DISCONNECT ELECTRIC VEHICLE CHARGING CABLE CONNECTOR

CROSS-REFERENCES TO RELATED APPLICATIONS

This application relates to and claims priority from the following U.S. patent applications. This application claims priority to and the benefit of U.S. Provisional Patent Application No. 63/471,111, filed Jun. 5, 2023, which is incorporated herein by reference in its entirety. This application is a continuation of PCT Application No. PCT/US23/22981, filed Aug. 10, 2023, which claims priority to and benefit of U.S. Provisional Patent Application No. 63/471,111, filed Jun. 5, 2023, which is incorporated herein by reference in its entirety. PCT Application No. PCT/US23/22981 also claims priority to and the benefit of Pakistani Patent Application No. 229/2023, filed Apr. 17, 2023. This application also claims priority to and the benefit of Pakistani Patent Application No. 229/2023, filed Apr. 17, 2023. Each of the above-referenced applications are incorporated herein by reference in its entirety.

BACKGROUND OF THE INVENTION

1. Field of the Invention

The present invention relates to a connector for a cable for an electric vehicle charging station, and more specifically to a cable having a quick disconnect mechanism where an earth wire connects the cable and the electric vehicle charging station before any other pins connect during the attachment process.

2. Description of the Prior Art

It is generally known in the prior art to provide cables for charging electric vehicles. While charging cables for home use are often able to be attached directly to an electrical outlet or a small home station, commercial charging cables are typically connected to a charging station, or an electrical vehicle supply equipment (EVSE).

Prior art patent documents include the following:

U.S. Pat. No. 8,025,528 for Quick mounting device with modules by inventor Smith, filed Sep. 7, 2010 and issued Sep. 27, 2011, discloses a quick mounting device for appliances that is quickly and easily engaged and disengaged mechanically without the use of tools and has at least one modular connection.

U.S. Pat. No. 4,645,286 for Quick connect power tap system by inventors Isban et al., filed Feb. 10, 1983 and issued Feb. 24, 1987 discloses a coupling device which allows for quickly changing electrical fixtures without rewiring. The quick change mounting fixture comprises a combined electrical and mechanical two-piece male and female fastening device. The invention allows for consumer as well as professional installation and detachment of fixtures by providing an easy and safe method. All wires and contacts are self contained and shielded from accidental contact. The invention comprises a female receptacle plate for mounting to a standard ceiling or wall mounted electrical junction box, a male tap support plate which also functions as a fixture support, a block terminal support, where contacts and wire routes are located, and a shield cover.

SUMMARY OF THE INVENTION

The present invention relates to a connector for a cable for an electric vehicle charging station, and more specifically to a cable having a quick disconnect mechanism where an earth wire connects the cable and the electric vehicle charging station before any other pins connect during the attachment process.

It is an object of this invention to provide an easy and safe cable connector for an electric vehicle charger between the cable and a charging station, while providing a tonight connection at the connection interface.

In one embodiment, the present invention is directed to a system for connecting charging cables, including a first cable including a male connector apparatus on one end, a second cable including a female connector apparatus on one end, wherein the female connector apparatus is configured to matingly engage with the male connector apparatus, a plurality of spring-loaded pins extending outwardly from a face of the male connector apparatus, wherein a face of the female connector defines a plurality of recessed arcuate slots, wherein the plurality of recessed arcuate slots each include an opening extending through a full thickness of the female connector apparatus sized and shaped to fit one of the plurality of spring-loaded pins, wherein each of the plurality of recessed arcuate slots is partially covered by one of a plurality of tabs, wherein each of the plurality of tabs include a hole configured to receive one of the plurality of spring-loaded pins, and wherein, in a default position, the holes in each of the plurality of tabs are not aligned with the openings of the corresponding plurality of recessed arcuate slots.

In another embodiment, the present invention is directed to a cable connector apparatus, including a cable including a female connector apparatus on one end, wherein the female connector apparatus is configured to matingly engage with a male connector apparatus, wherein a face of the female connector defines a plurality of recessed arcuate slots, wherein the plurality of recessed arcuate slots each include an opening extending through a full thickness of the female connector apparatus sized and shaped to fit one of a plurality of spring-loaded pins, wherein each of the plurality of recessed arcuate slots is partially covered by one of a plurality of tabs, wherein each of the plurality of tabs include a hole configured to receive one of the plurality of spring-loaded pins, wherein, in a default position, the holes in each of the plurality of tabs are not aligned with the openings of the corresponding plurality of recessed arcuate slots, and wherein each of the plurality of tabs are connected to at least one radial biasing member, such that when force is not being applied to the plurality of tabs, the at least one radial biasing member causes each of the plurality of tabs to be restored to a rest position.

In yet another embodiment, the present invention is directed to a system for connecting charging cables, including a first cable including a male connector apparatus on one end, a second cable including a female connector apparatus on one end, wherein the female connector apparatus is configured to matingly engage with the male connector apparatus, a plurality of spring-loaded pins extending outwardly from a face of the male connector apparatus, wherein a face of the female connector defines a plurality of recessed arcuate slots, wherein the plurality of recessed arcuate slots each include an opening extending through a full thickness of the female connector apparatus sized and shaped to fit one of the plurality of spring-loaded pins, wherein each of the plurality of recessed arcuate slots is partially covered by one of a plurality of tabs, wherein each of the plurality of tabs include a hole configured to receive one of the plurality of spring-loaded pins, and wherein the male connector apparatus and the female connector apparatus are held in intimate contact by at least one bayonet mechanism.

These and other aspects of the present invention will become apparent to those skilled in the art after a reading of the following description of the preferred embodiment when considered with the drawings, as they support the claimed invention.

DETAILED DESCRIPTION

Figure 1:
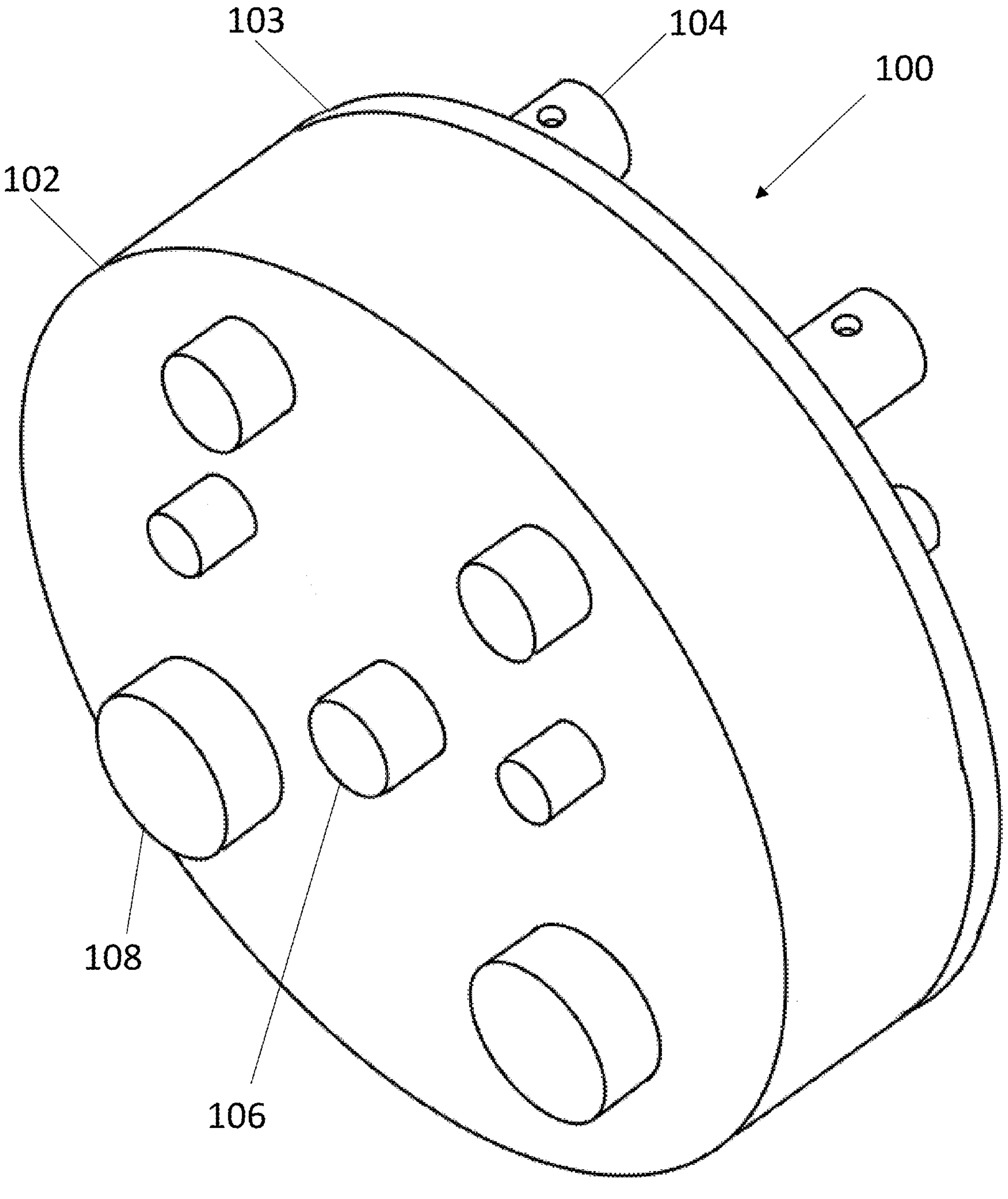
FIG. 1 illustrates a perspective view of a male connector for use in a connection system according to one embodiment of the present invention.

The present invention is generally directed to a connector for a cable for an electric vehicle charging station, and more specifically to a cable having a quick disconnect mechanism where an earth wire connects the cable and the electric vehicle charging station before any other pins connect during the attachment process.

In one embodiment, the present invention is directed to a system for connecting charging cables, including a first cable including a male connector apparatus on one end, a second cable including a female connector apparatus on one end, wherein the female connector apparatus is configured to matingly engage with the male connector apparatus, a plurality of spring-loaded pins extending outwardly from a face of the male connector apparatus, wherein a face of the female connector defines a plurality of recessed arcuate slots, wherein the plurality of recessed arcuate slots each include an opening extending through a full thickness of the female connector apparatus sized and shaped to fit one of the plurality of spring-loaded pins, wherein each of the plurality of recessed arcuate slots is partially covered by one of a plurality of tabs, wherein each of the plurality of tabs include a hole configured to receive one of the plurality of spring-loaded pins, and wherein, in a default position, the holes in each of the plurality of tabs are not aligned with the openings of the corresponding plurality of recessed arcuate slots.

In another embodiment, the present invention is directed to a cable connector apparatus, including a cable including a female connector apparatus on one end, wherein the female connector apparatus is configured to matingly engage with a male connector apparatus, wherein a face of the female connector defines a plurality of recessed arcuate slots, wherein the plurality of recessed arcuate slots each include an opening extending through a full thickness of the female connector apparatus sized and shaped to fit one of a plurality of spring-loaded pins, wherein each of the plurality of recessed arcuate slots is partially covered by one of a plurality of tabs, wherein each of the plurality of tabs include a hole configured to receive one of the plurality of spring-loaded pins, wherein, in a default position, the holes in each of the plurality of tabs are not aligned with the openings of the corresponding plurality of recessed arcuate slots, and wherein each of the plurality of tabs are connected to at least one radial biasing member, such that when force is not being applied to the plurality of tabs, the at least one radial biasing member causes each of the plurality of tabs to be restored to a rest position.

In yet another embodiment, the present invention is directed to a system for connecting charging cables, including a first cable including a male connector apparatus on one end, a second cable including a female connector apparatus on one end, wherein the female connector apparatus is configured to matingly engage with the male connector apparatus, a plurality of spring-loaded pins extending outwardly from a face of the male connector apparatus, wherein a face of the female connector defines a plurality of recessed arcuate slots, wherein the plurality of recessed arcuate slots each include an opening extending through a full thickness of the female connector apparatus sized and shaped to fit one of the plurality of spring-loaded pins, wherein each of the plurality of recessed arcuate slots is partially covered by one of a plurality of tabs, wherein each of the plurality of tabs include a hole configured to receive one of the plurality of spring-loaded pins, and wherein the male connector apparatus and the female connector apparatus are held in intimate contact by at least one bayonet mechanism.

Electric vehicle (EV) charging is becoming a hot topic, as ownership in electric vehicles continues to increase every year. The convenience and economic efficiency of a charging network is one of the essential elements in continuing to encourage the development of the EV market. EV charging is typically conducted at two different types of devices. First, at home chargers are often used while the EV is not in use and provide consistent, albeit typically slow, charging. Home chargers take different forms, with some connecting directly to a wall outlet and others connected to a home station that, for example, is able to increase the wattage of power provided to charge faster. Otherwise, EVs are typically charged at commercial charging stations, often referred to as electric vehicle supply equipment (EVSE).

One issue with both EVSEs and some home stations is the replacement of charging cables, which often needs to happen as often as every six months. Replacement of charging cables is often a tedious task, as it frequently requires rewiring the whole connection between the cable and the station. Therefore, a more easily replaceable, quick-connect charging solution is needed. However, caution needs to be taken when designing a quick-connect cable, as the high voltages being dealt with make potential shocks a potentially lethal possibility. Therefore, what is needed is not only a quick connect charging cable for easier replacement, but one that prioritizes a ground connection for reducing the risk of electric shock.

Referring now to the drawings in general, the illustrations are for the purpose of describing one or more preferred embodiments of the invention and are not intended to limit the invention thereto.

FIG. 1 illustrates a perspective view of a male connector for use in a connection system according to one embodiment of the present invention. A male connector 100 includes a base 103 connected with a cap 102. A plurality of pins 106, 108 extend outwardly from the base 103 through openings in the cap 102, such that the pins 106, 108 extend fully through the cap 102 and therefore each have an exposed first end. The plurality of pins 106, 108 extend through the base 103 therefore have a second end 104, typically within a cable casing, as the pins 106, 108 are attached to wires within a charging station connector cable or within a charging cable (depending on which is attached to the male connector 100). In one embodiment, the central pin 106 of the male connector 100 is connected to an earth wire that grounds the system, thereby reducing buildup of charge and/or electric charge leakage that could potentially cause a fire or lethal shock to an operator. In another embodiment, the central pin 106 is connected to a neutral wire.

Figure 2:
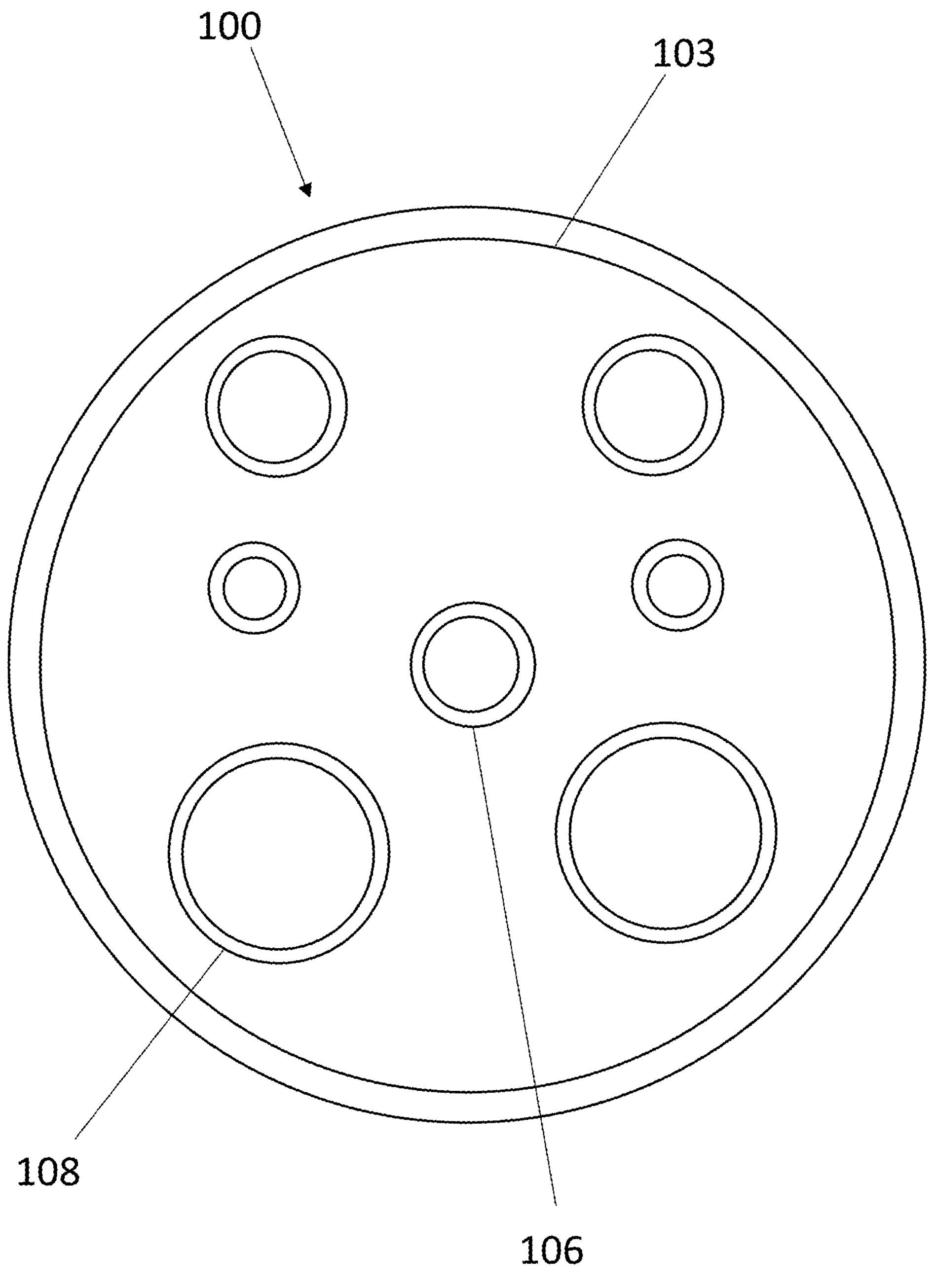
FIG. 2 illustrates a front orthogonal view of a male connector for use in a connection system according to one embodiment of the present invention.

FIG. 2 illustrates a front orthogonal view of a male connector for use in a connection system according to one embodiment of the present invention. The male connector 100 includes a plurality of pins 106, 108, including a central pin 106 and one or more peripheral, or satellite pins 108. In one embodiment, the peripheral pins 108 connect one or more "hot wires," or current-carrying wires between the male connector 100 and a female connector. In one embodiment, one or more of the peripheral pins 108 are also connected to at least one earth wire, allowing the system to have multiple grounded wires. In one embodiment, the peripheral pins 108 are oriented around the central ground pin 106. However, one of ordinary skill in the art will understand that the relative positioning of the ground pin 106 and the current-carrying pins 108 are able to be varied. Furthermore, the size of each pin is able to vary, as seen in FIG. 2, or be the same, usually depending on the type of connector used.

While FIG. 2 illustrates six peripheral pins 108 surrounding one central earth pin 106, one of ordinary skill in the art will understand that the number of peripheral pins 108 is able to be varied, usually depending on the type of connector being used. For example, in one embodiment, the charging cable includes an IEC 62196 Type 2 connector. Some versions of Type 2 connectors include, for example, a central earth wire surrounded by one neutral wire, one alternating current (AC) wire, one positive direct current (DC) wire, one negative DC wire, one proximity pilot (PP) wire (for pre-insertion signaling), and one control pilot (CP) wire for post-insertion signaling. However, even among type 2 connectors, the specific wires vary, with some Type 2 connectors having a three-phase AC port instead of having any DC wires, or including two pairs of DC wires instead of the AC and neutral wires. Furthermore, EV charging connections able to be used with the present invention are not limited to a Type 2 connector. An IEC 62196 Type 3 connector, for example, sometimes includes as few as four wires, or as many as seven. The present invention is also compatible with connector types that are not specifically used for electric vehicles, such as a typical three-prong Type B charger used in North America. The present invention is able to be adapted to the number of pins and/or cross-section shape or area necessary to accommodate any connector type.

Figure 3:
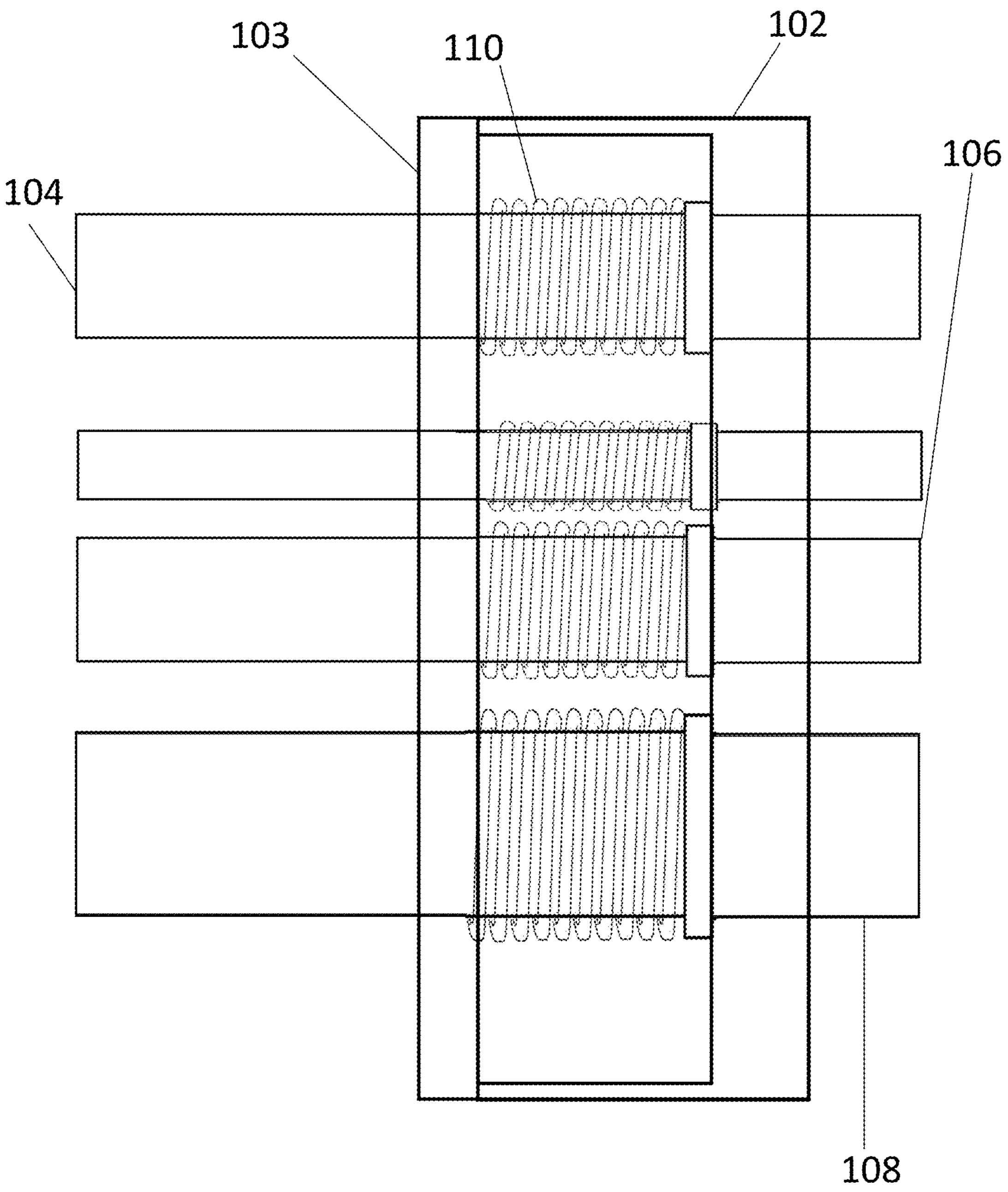
FIG. 3 illustrates a transparent side view of a male connector for use in a connection system according to one embodiment of the present invention.

FIG. 3 illustrates a transparent side view of a male connector for use in a connection system according to one embodiment of the present invention. In one embodiment, one or more of the pins include at least one biasing element 110 (e.g., at least one spring). The at least one biasing element 110 for each pin is positioned around each pin between the base 102 and an interior front end of the cap 102. The radius of the at least one biasing element 110 is selected such that, even when pressure is not applied to the corresponding pin, the at least one biasing element 110 is too large to move out of the cap 102, keeping the at least one biasing element 110 retained. However, the pin itself has a radius smaller than the radius of a corresponding opening in the cap 102, allowing each pin to move into and out of the cap 102.

Figure 4:
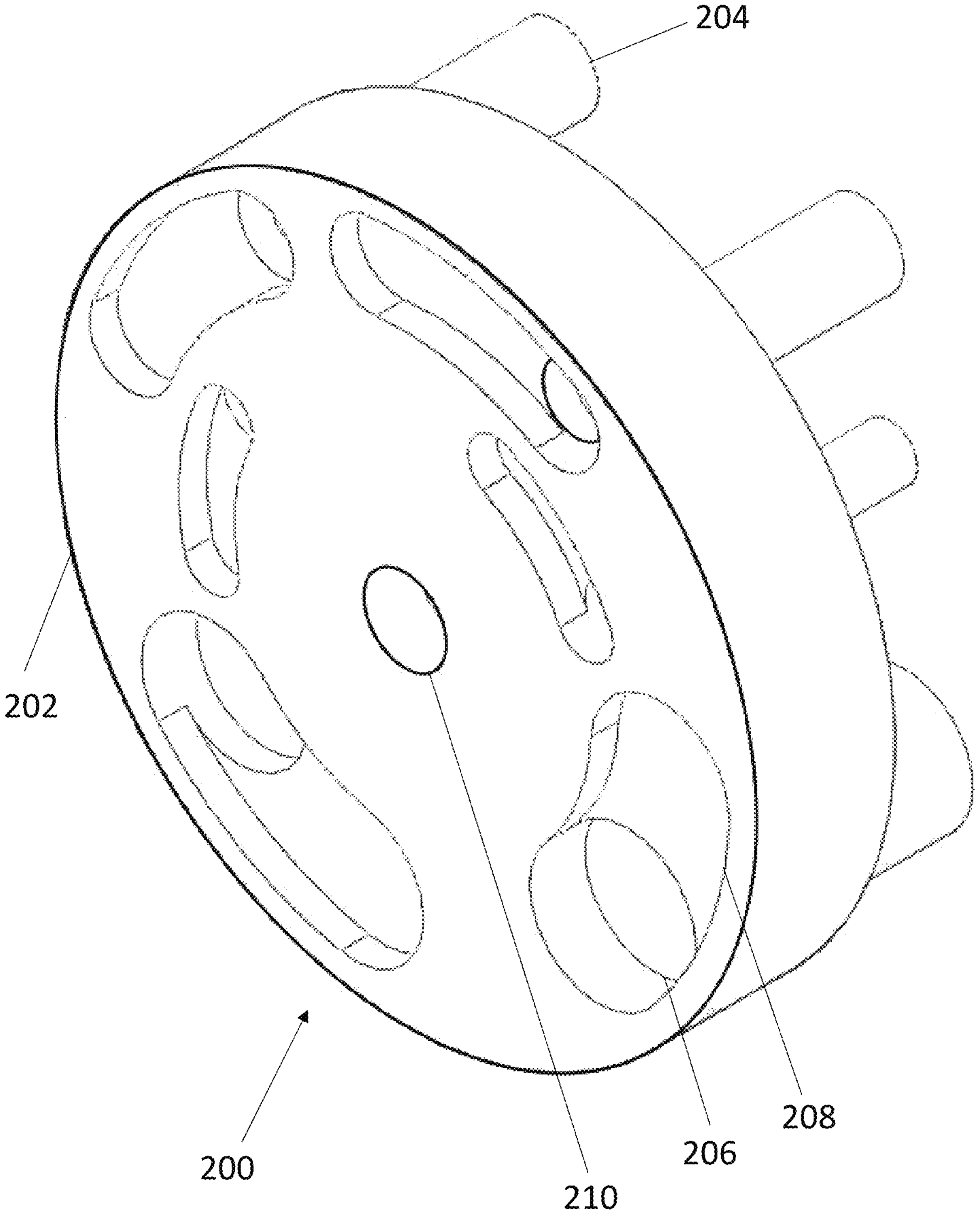
FIG. 4 illustrates a perspective view of a female connector for use in a connection system according to one embodiment of the present invention.
Figure 5:
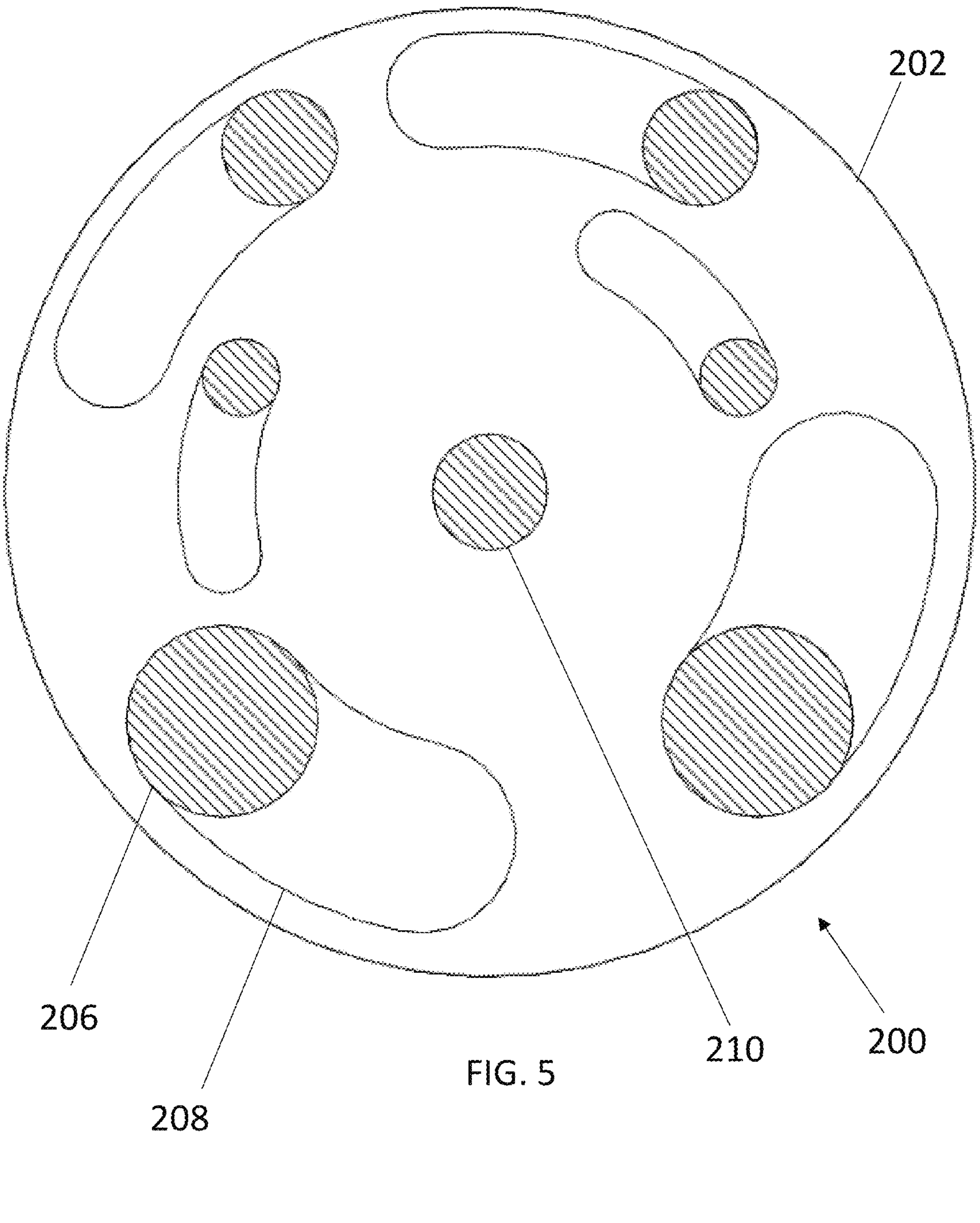
FIG. 5 illustrates a front orthogonal view of a female connector for use in a connection system according to one embodiment of the present invention.

FIGS. 4 and 5 illustrate a female connector for use in a connection system according to one embodiment of the present invention. A female connector 200 includes a front face 202. A plurality of pins 204 extend outwardly from the female connector 200 from a side opposite the front face 202. The front face 202 includes a central opening 210 and a plurality of radial slots 208. The plurality of radial slots 208 are arcuate depressions in the surface of the front face 202. In a preferred embodiment, the plurality of radial slots 208 do not extend fully through the thickness of the female connector 200. In one embodiment, each of the plurality of radial slots 208 extends through most, but not all, of a top section 212 of the female connector 200, but does not extend through a bottom section 214 of the female connector 200. In one embodiment, each of the radial slots 208 includes a corresponding opening 206 that extends through the entire thickness of the top section 212 of the female connector 200. The top section 212 of the female connector 200 and the bottom section 214 of the female connector 200 are rotatable with respect to each other, allowing the corresponding opening 206 to align of each radial slot 208 to align with an opening extending through the bottom section 214 of the female connector 200. In this embodiment, the opening extend through the bottom section 214 is aligned with a corresponding pin 204, such that rotating the top section 212 with respect to the bottom section 214 provides access to connect with the corresponding pin 204 from the front face 202. In one embodiment, the top section 212 of the female connector 200 is spring loaded such that, when no torque is applied, the female connector 200 is automatically restored to a position through the openings in the top and bottom sections are not aligned.

In another embodiment, at least one pin opening extends from a bottom surface of each of the plurality of radial slots 208 through the thickness of the female connector. The pin opening is aligned with a corresponding pin 204 and therefore provides access to the corresponding pin 204. In one embodiment, the bottom surface of each of the plurality of radial slots 208 is mostly covered by an arcuate tab. The arcuate tab includes an opening 206 that extends through the arcuate tab, thereby exposing the bottom surface of a corresponding radial slot 208. In one embodiment, in a closed position, each arcuate tab covers the pin opening of the corresponding radial slot 208. In one embodiment, the female connector includes at least one annular passage, allowing each arcuate tab to move across the length of the corresponding radial slot 208. Movement of the arcuate tabs across the length of the radial slot 208 allows the opening 206 to move across the length of the radial slot 208. In one embodiment, each arcuate tab is able to move from a closed position to an open position, where the opening 206 in the arcuate tab is aligned with the pin opening, thereby allowing access from the front face 202 through to each corresponding pin 204. In one embodiment, each arcuate tab is spring loaded (or otherwise biased) such that, when no pressure is applied to each tab, the tabs automatically restore to a closed position where the opening 206 is not aligned with the pin opening. This embodiment does not require distinct, rotatable top or bottom sections of the female connector 200, as movement of the arcuate tabs does not require rotation of the female connector 200 itself. The plurality of radial slots 208 are configured such that the corresponding opening 206 is able to move across the length of the radial slot 208 from one end to the other.

Figure 6:
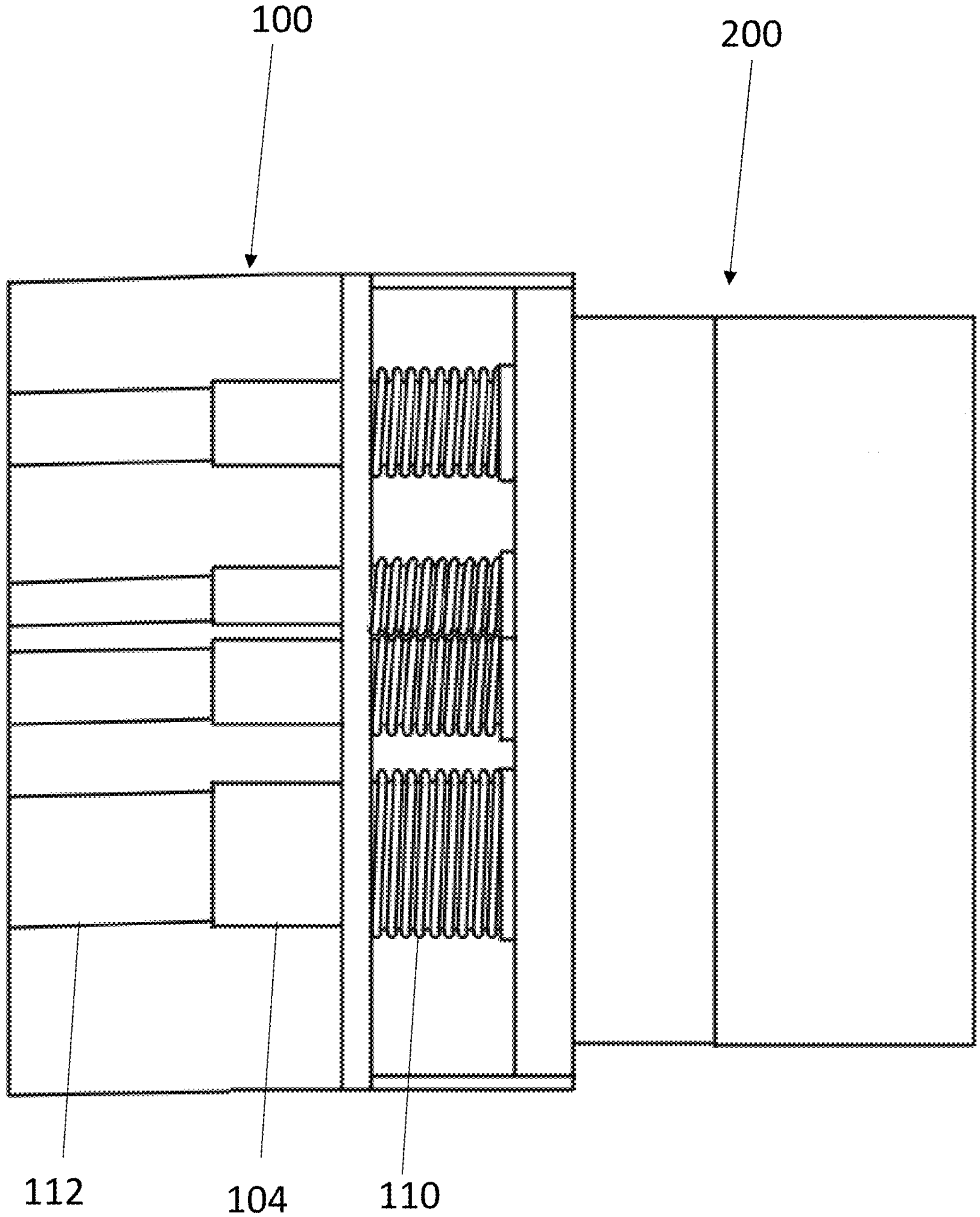
FIG. 6 illustrates a transparent side view of a connection system including male and female members connected according to one embodiment of the present invention.

FIG. 6 illustrates a transparent side view of a connection system including male and female members connected according to one embodiment of the present invention. In one embodiment, before the male connector 100 and female connector 200 are brought together, the female connector 200 is in a closed position, meaning that no access is provided to pins of the female connector 200. The male connector 100 is pressed against the female connector 200, such that the central pin of the male connector 100 enters a central opening of the female connector 200. In one embodiment, the peripheral pins 104 of the male connector enter corresponding openings in arcuate tabs nested within the plurality radial slots of the female connector 200. As mentioned with regard to FIGS. 4 and 5, the opening in the arcuate tabs are not aligned with a pin opening in the female connector in a closed position, meaning the central pin of the male connector 100 (preferably connected to the earth wire) will be the first to connect with a pin of the female connector 200. The peripheral pins 104 are pressed against the bottom surface of the radial slots, causing a corresponding biasing element 110 (e.g., a spring) of each peripheral pin 104 to compress. As the male connector 100 is rotated with respect to the female connector 200, the female connector 200 moves from a closed position to an open position, causing the openings in the arcuate tabs to move across the radial slots, providing access to the pins of the female connector 200. When this open position is reached, the biasing elements 110 for each pin 104 of the male connector 100 exhibit a restoring force, causing the pins 104 of the male connector 100 to extend and push up against the pins of the female connector 200, thereby fully connecting the male connector 100 and female connector 200.

The springs 110 surrounding the pins 104 of the male connector 100 serve at least three useful purposes according to the present invention. First, they allow the pins 104 to be pushed in and then pop out when the female connector 200 reaches an open position, providing for a system that allows the ground wire to be connected before the peripheral pins. Second, they provide restoring force to maintain firm contact between the pins of the male connector 100 and the female connector 200. Finally, in the event that the cable shakes or the connection is otherwise shaken, the springs help to distribute force such that the connectors are less likely to be damaged and therefore able to work for a longer period of time.

In one embodiment, the male connector 100 and the female connector 200 are held together via at least one bayonet mechanism. Bayonet mechanisms are broadly known to one of ordinary skill in the art, but broadly include a plurality of prongs extending outwardly from the sides of one of the connectors that are configured to enter matching L-shaped slots in a set of hollow extensions to the side walls of the other connector, such that, when turned to allow the female connector to enter an open position, the prong moves through the L-shaped slot to prevent the two components from separating without rotating the connectors in an opposite direction such that the prong is able to exit the L-shaped slot. One of ordinary skill in the art will understand that methods of detaching the connectors in a bayonet configuration include any method known in the art, including pushing the connectors together and rotating them such that the prongs are able to exit the L-shaped slots. In one embodiment, once the male connector 100 and female connector are mated, one or more screws, bolts, latches and/or nails are used to ensure that the connection remains intact. In another embodiment, only latches, screws, bolts, or nails are used to attach the connectors, with no bayonet mechanism utilized. In another embodiment, the male connector 100 and the female connector 200 include mating threading, such that, when the connectors are rotated to align the pins, the threading engages to retain the connection between the connectors. However, one of ordinary skill in the art will understand that the configurations used to retain connections between the connectors are not intended to be limiting according to the present invention.

One of ordinary skill in the art will understand that while the male and female connectors are shown to both have substantially circular cross sections in FIGS. 1-2 and 4-5, the present invention is not limited to only circular cross sections. The male and female connectors are able to have ovular, elliptical, triangular, pentagonal, hexagonal, octagonal, and/or otherwise shaped cross sections, potentially depending on the type of connector used.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for connecting charging cables, comprising:

a first cable including a male connector apparatus on one end;

a second cable including a female connector apparatus on one end, wherein the female connector apparatus is configured to matingly engage with the male connector apparatus;

a plurality of spring-loaded pins extending outwardly from a face of the male connector apparatus;

wherein a face of the female connector defines a plurality of recessed arcuate slots;

wherein the plurality of recessed arcuate slots each include an opening extending through a full thickness of the female connector apparatus sized and shaped to fit one of the plurality of spring-loaded pins;

wherein each of the plurality of recessed arcuate slots is partially covered by one of a plurality of tabs;

wherein each of the plurality of tabs include a hole configured to receive one of the plurality of spring-loaded pins; and wherein, in a default position, the holes in each of the plurality of tabs are not aligned with the openings of the corresponding plurality of recessed arcuate slots.

2. The system of claim 1, wherein each of the plurality of tabs are connected to at least one radial biasing member, such that when force is not being applied to the plurality of tabs, the at least one radial biasing member causes each of the plurality of tabs to be restored to a rest position.

3. The system of claim 1, wherein the plurality of recessed arcuate slots are located at different radial and circumferential positions on the face of the female connector apparatus.

4. The system of claim 1, wherein the first cable and the second cable are electric vehicle charging cables.

5. The system of claim 1, wherein the male connector apparatus and the female connector apparatus are held in intimate contact by at least one bayonet mechanism.

6. The system of claim 1, wherein a center of the face of the female connector apparatus includes a central opening for receiving a central spring-loaded pin of the male connector apparatus.

7. The system of claim 6, wherein the central spring-loaded pin is a pin corresponding to an earth wire.

8. The system of claim 1, wherein after the plurality of spring-loaded pins are inserted in the holes of the plurality of tabs, rotation of the male connector apparatus relative to the female connector apparatus causes movement of the plurality of tabs within the plurality of recessed arcuate slots until the holes of the plurality of tabs align with the openings of the plurality of recessed arcuate slots.

9. A cable connector apparatus, comprising:

a cable including a female connector apparatus on one end, wherein the female connector apparatus is configured to matingly engage with a male connector apparatus;

wherein a face of the female connector defines a plurality of recessed arcuate slots;

wherein the plurality of recessed arcuate slots each include an opening extending through a full thickness of the female connector apparatus sized and shaped to fit one of a plurality of spring-loaded pins;

wherein each of the plurality of recessed arcuate slots is partially covered by one of a plurality of tabs;

wherein each of the plurality of tabs include a hole configured to receive one of the plurality of spring-loaded pins;

wherein, in a default position, the holes in each of the plurality of tabs are not aligned with the openings of the corresponding plurality of recessed arcuate slots; and wherein each of the plurality of tabs are connected to at least one radial biasing member, such that when force is not being applied to the plurality of tabs, the at least one radial biasing member causes each of the plurality of tabs to be restored to a rest position.

10. The cable connector apparatus of claim 9, wherein the female connector apparatus includes at least one lateral pin and/or at least one lateral slot configured to engage with a corresponding pin and/or a corresponding slot of a male connector apparatus to form at least one bayonet mechanism operable to hold the female connector apparatus in intimate contact with the male connector apparatus.

11. The cable connector apparatus of claim 9, wherein the cable is an electric vehicle charging cable.

12. The cable connector apparatus of claim 9, wherein the plurality of recessed arcuate slots are located at different radial and circumferential positions on the face of the female connector apparatus.

13. The cable connector apparatus of claim 9, wherein a center of the face of the female connector apparatus includes a central opening for receiving a central spring-loaded pin of the male connector apparatus.

14. The cable connector apparatus of claim 13, wherein the central spring-loaded pin is a pin corresponding to an earth wire.

15. The cable connector apparatus of claim 9, wherein after the plurality of spring-loaded pins are inserted in the holes of the plurality of tabs, rotation of the male connector apparatus relative to the female connector apparatus causes movement of the plurality of tabs within the plurality of recessed arcuate slots until the holes of the plurality of tabs align with the openings of the plurality of recessed arcuate slots.

16. A system for connecting charging cables, comprising:

a first cable including a male connector apparatus on one end;

a second cable including a female connector apparatus on one end, wherein the female connector apparatus is configured to matingly engage with the male connector apparatus;

a plurality of spring-loaded pins extending outwardly from a face of the male connector apparatus;

wherein a face of the female connector defines a plurality of recessed arcuate slots;

wherein the plurality of recessed arcuate slots each include an opening extending through a full thickness of the female connector apparatus sized and shaped to fit one of the plurality of spring-loaded pins;

wherein each of the plurality of recessed arcuate slots is partially covered by one of a plurality of tabs;

wherein each of the plurality of tabs include a hole configured to receive one of the plurality of spring-loaded pins; and wherein the male connector apparatus and the female connector apparatus are held in intimate contact by at least one bayonet mechanism.

17. The system of claim 16, wherein the first cable and the second cable are electric vehicle charging cables.

18. The system of claim 16, wherein a center of the face of the female connector apparatus includes a central opening for receiving a central spring-loaded pin of the male connector apparatus.

19. The system of claim 18, wherein the central spring-loaded pin is a pin corresponding to an earth wire.

20. The system of claim 16, wherein the plurality of recessed arcuate slots are located at different radial and circumferential positions on the face of the female connector apparatus.

* * * * *